United States Patent
Bleck et al.

(10) Patent No.: US 6,549,018 B1
(45) Date of Patent: Apr. 15, 2003

(54) METHOD FOR MEASURING THE INDIVIDUAL CROSSTALK IN WAVELENGTH-DIVISION MULTIPLEX SYSTEMS AND WAVELENGTH DIVISION MULTIPLEX SYSTEM

(75) Inventors: Oliver Bleck, Munich (DE); Andres Fricke, Munich (DE); Rainer Wiesmann, Geltendorf (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/610,457

(22) Filed: Jul. 5, 2000

(30) Foreign Application Priority Data

Jul. 5, 1999 (DE) .......................................... 199 30 975

(51) Int. Cl.$^7$ ............................................. G01R 27/28
(52) U.S. Cl. ..................................... 324/628; 324/158.1
(58) Field of Search ................................. 324/628, 760, 324/76.12, 76.59, 76.56, 95, 631, 637, 158.1; 356/352; 359/121, 124, 133; 361/778

(56) References Cited

U.S. PATENT DOCUMENTS

| | | | | |
|---|---|---|---|---|
| 5,920,414 A | * | 7/1999 | Masahide | |
| 6,011,623 A | * | 1/2000 | MacDonald | |
| 6,081,359 A | * | 6/2000 | Takehana | |
| 6,141,126 A | * | 10/2000 | Lahat | |
| 6,191,877 B1 | * | 2/2001 | Chraplyvy | |

FOREIGN PATENT DOCUMENTS

WO          WO 99/08350          2/1999

* cited by examiner

*Primary Examiner*—Kamand Cuneo
*Assistant Examiner*—Trung Nguyen
(74) *Attorney, Agent, or Firm*—Bell Boyd & Lloyd LLC

(57) ABSTRACT

The invention is directed to a wavelength-division multiplex system and to a method for measuring the individual crosstalk of a specific, of a plurality or of all channels onto a payload channel in wavelength-division multiplex systems.

Figure 1:
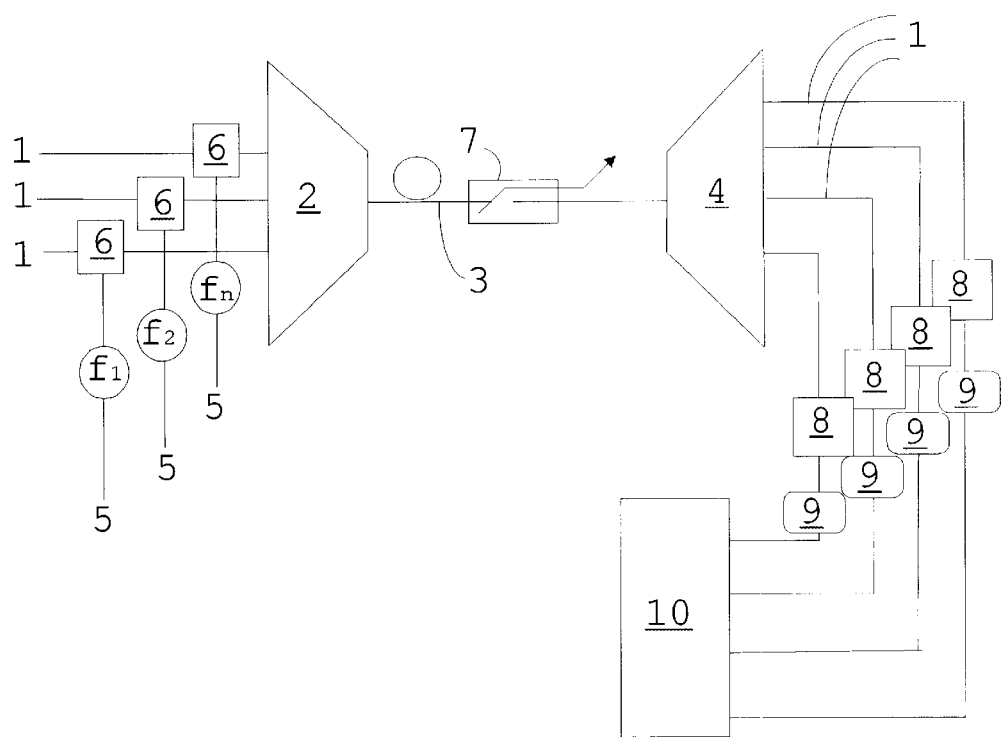

The invention is characterized in that n identification frequencies $f^{(n)}$ (5) with a modulation factor $m^{(n)}$ are modulated onto a payload signal and the current crosstalk is calculated.

32 Claims, 1 Drawing Sheet

METHOD FOR MEASURING THE INDIVIDUAL CROSSTALK IN WAVELENGTH-DIVISION MULTIPLEX SYSTEMS AND WAVELENGTH DIVISION MULTIPLEX SYSTEM

The invention is directed to a wavelength-division multiplex system and to a method for measuring the individual crosstalk of a specific, of a plurality or of all channels on a payload channel in optical transmission systems, particularly in wavelength-division multiplex systems, comprising n WDM channels, an input-side multiplexer that combines the n WDM channels supplied to it with different frequencies, a following transmission link and an output-side demultiplexer that respectively divides an optical signal incoming on a fiber onto n WDM channels.

In optical transmission systems, the technique of wavelength-division multiplex (WDM) is a frequently utilized method for utilizing the greatest bandwidth of the optical fiber. Within the framework of network monitoring of such systems, it is often desirable to know the crosstalk behavior of all channels on a payload channel being observed. The knowledge of the crosstalk of only one defined channel on the payload channel being observed or the statement about the proportion with which the individual channels participate in the overall crosstalk can also be significant.

For work in the laboratory, there is the solution that the optical spectrum is registered with an extremely great precision. Lines appear in the spectrum at the locations of the crosstalking channels, but these can only be resolved with great outlay. The crosstalk can be identified by measuring these lines and the signal power of the payload channel. This solution is so involved that it can only be employed in the laboratory. It is too complicated and too expensive or, respectively, not economically feasible for an employment in general operations.

It is therefore an object of the invention to develop a method for measuring the individual crosstalk of a specific, or a plurality or of all channels on a payload channel in wavelength-division multiplex systems that is significantly simplified.

Moreover, a wavelength-division multiplex system for application of the inventive method is presented.

The object of developing a method is achieved by the features of the first method claim; the object of developing a wavelength-division multiplex system is achieved by the features of the first apparatus claim.

The inventors have recognized that, given a frequency impressed onto an optical payload signal, the part of the photocurrent of the payload signal this is picked up by a photodiode and is synchronous with the impressed frequency derives as $$I_{Ph\_synch,channel} = m \cdot R_{Ph} \cdot T_{DEMUX} \cdot P_{Signal\_opt,channel} \quad (1)$$

with the transmission of the demultiplexer $T_{DEMUX}$, the responsivity of the photodiode $R_{Ph}$, the modulation factor m and the optical signal power of the WDM channel $P_{Signal\_opt,channel}$.

The synchronous parts of each individual crosstalking signal (n) are calculated from $$I_{Ph\_synch,frequency}^{(n)} = m^{(n)} \cdot R_{Ph} \cdot T_{DEMUX} \cdot P_{Signal\_opt,frequency}^{(n)} \quad (2)$$

with the corresponding modulation factor $m^{(n)}$ and the optical signal power of the corresponding WDM channel $P_{Signal\_opt,frequency}^{(n)}$.

The non-synchronous part of the photocurrent is composed of the non-modulated signal levels of the payload channel $(1-m^{(n)}) P_{Signal\_opt,frequency}$, the optical noise $P_{noise\_opt}$ and the photodiode dark current $I_{D\_Ph}$. The non-synchronous part derives as $$I_{Ph\_nonsynch} = \quad (3)$$
$$R_{Ph} \cdot T_{DEMUX} \cdot \left[ \left( \sum_{n=1}^{M-1} (1-m)^{(n)} \right) \cdot P_{Signal\_opt,frequency}^{(n)} + \right.$$
$$\left. (1-m) P_{Signal\_opt,channel} + NB_{DEMUX} \cdot P_{Noise\_opt} \right] + I_{D\_ph}$$

with the effective noise bandwidth of the optical demultiplexer $NB_{DEMUX}$.

This non-synchronous part can also be utilized for determining the optical signal-to-noise ratio (OSNR).

The optical signal power of the WDM payload channel derives from (1) as $$P_{Signal\_opt,channel} = \frac{I_{Ph\_synch,channel}}{m \cdot R_{Ph} \cdot T_{DEMUX}} \quad (4)$$

The optical signal power of the individual crosstalking channels derives from (2) as $$P_{Signal\_opt,frequency}^{(n)} = \frac{I_{Ph\_synch,frequency}^{(n)}}{m^{(n)} \cdot R_{Ph} \cdot T_{DEMUX}} \quad (5)$$

The crosstalk (CT) of an arbitrary channel on the payload channel is defined from $$CT_{Frequency^{(n)} \leftrightarrow channel} = 10 \cdot \log\left(\frac{P_{Signal\_opt,frequency}^{(n)}}{P_{Signal\_opt,channel}}\right) \quad (6)$$

Consequently following with (4) and (5) is $$CT_{Frequency^{(n)} \leftrightarrow Channel} = 10 \cdot \log\left(\frac{I_{Ph\_synch,frequency}^{(n)}}{I_{Ph\_synch,channel}} \cdot \frac{m}{m^{(n)}}\right) \quad (7)$$

It is meaningful, although not necessary, to employ the same modulation factor for all channels. Equation (7) is then simplified into $$CT_{Frequency^{(n)} \leftrightarrow Channel} = 10 \cdot \log\left(\frac{I_{Ph\_synch,frequency}^{(n)}}{I_{Ph\_synch,channel}}\right) \quad (8)$$

Only the ratio of the synchronous currents thus need be considered for the calculation of the crosstalk. The crosstalk calculated by Equation (8) thus reproduces the influence of a defined channel on the payload channel.

When all influencing channels are to be taken into consideration, then the following is valid for different modulation factors and M crosstalking channels $$CT_{Frequency \leftrightarrow Channel} = 10 \cdot \log\left(\frac{\left(\sum_{n=1}^{M-1} \frac{I_{Ph\_synch,frequency}^{(n)}}{m^{(n)}} \cdot m\right)}{I_{Ph\_synch,channel}}\right) \quad (9)$$

The following is valid for identical modulation factors $$CT_{Frequency \leftrightarrow Channel} = 10 \cdot \log \left( \frac{\sum_{n=1}^{M-1} I_{Ph\_synch,frequency}^{(n)}}{I_{Ph\_synch,channel}} \right) \quad (10)$$

Since no component-dependent quantities are utilized for the calculation, the determination of the crosstalk is independent of the generation of the identification frequency as well as of the components needed for the evaluation.

In conformity with the above perceptions, the inventors, according to claim 1, propose that a method for measuring the individual crosstalk of a specific, of a plurality or of all channels on a payload channel in optical transmission systems, particularly in wavelength-division multiplex systems, comprising n WDM channels, an input-side multiplexer that combines the n WDM channels supplied to it with different frequencies, a following transmission link and an output-side demultiplexer that respectively divides an optical signal incoming on a fiber onto n WDM channels be improved to the effect that n identification frequencies $f^{(n)}$ are modulated onto a payload signal with a modulation factor $m^{(n)}$ and the current crosstalk is calculated.

The current crosstalk can be calculated by coupling a part of the optical power out of the transmission path.

The current crosstalk can also be calculated at the end of the transmission path.

For determining the crosstalk, a low-frequency identification frequency $f^{(n)}$ with the modulation index $m^{(n)}$ can be additionally modulated onto the high-frequency payload signal. This identification frequency is unambiguously measurably lower in frequency than the payload signal, namely such that it does not influence the behavior of other components in the transmission path such as, for example, fiber amplifiers (EDFAs—erbium doped fiber amplifiers).

The identification frequency differs for each WDM channel in the system.

These n different identification frequencies can, for example, be generated by variable optical attenuator.

Different identification frequencies can also be generated by low-frequency, direct modulation of the lasers or, respectively, of the transmission diode. Further, Mach-Zehnder or some other modulators can also be employed for impressing the identification frequencies.

It can also be advantageous to derive the identification frequency from the high-precision system clock of the transmission system that is also available to other network elements. Further, the identification frequency can be derived from the data rate, for example given SDH signals (SDH=simultaneous data hierarchy), so that a phase-locked reference can be made available for the lock-in amplifiers.

The various optical signals are superimposed on a fiber by the multiplexer.

In order to detect the current crosstalk at a specific location, a part of the optical power is coupled out of the transmission path with the assistance of a tap coupler.

Subsequently, the individual WDM channels can in turn be spatially separated from one another by a demultiplexer and the signals can be detected by photodiodes thereafter. The detection of n signals after the demultiplexer can ensue with the assistance of at least one through n photodiodes. When the detection ensues with a photodiode, the n signals can be redirected onto this photodiode with the assistance of a switch following the demultiplexer.

When the crosstalk is detected at the end of the transmission path, the existing demultiplexer as well as the existing receivers such as, for example, n photodiodes can be used. Coupling a part of the signal out is not required here.

The photocurrent supplied by the photodiode is composed of a part of the actual payload signal $I_{Ph\_synch,channel}$ that is synchronous with the frequency modulated on, of a synchronous part of each individual crosstalking signal $I_{Ph\_synch,frequency}^{(n)}$, as well as of a non-synchronous part $I_{Ph\_nonsynch}$ of all optical signals present on the channel.

The synchronous parts can be identified independently of one another by a phase-synchronous detector (what is referred to as a lock-in amplifier). The crosstalk of a specific channel, of a plurality of channels or of all channels on a payload channel can be calculated therefrom. The non-synchronous part can also be defined by measuring the overall power as well as the synchronous parts.

The crosstalk can be calculated from the relationship of the synchronous currents.

The crosstalk of an arbitrary channel on the payload channel can be determined via Equation (7).

The crosstalk of all influencing channels on the payload channel can be determined via Equation (9).

No component-dependent quantities are utilized for the evaluation of the crosstalk.

Particularly for utilizing the aforementioned method, the inventors also propose that a wavelength-division multiplex system comprising n WDM channels, an input-side multiplexer that combines the n WDM channels supplied to it with different frequencies, a following transmission link and an output-side demultiplexer that respectively divides an optical signal incoming on a fiber onto n WDM channels be improved to the effect that means for determining the crosstalk are provided.

Advantageously, the means for determining the crosstalk can be fashioned such that the crosstalk is determined with the assistance of n identification frequencies $f^{(n)}$ with a modulation factor $m^{(n)}$ that are modulated onto a payload signal.

The means for determining the crosstalk can be fashioned such that the crosstalk is determined by coupling a part of the optical power out from the transmission path.

Further, the means can be fashioned such that the crosstalk is determined at the end of the transmission path.

The n identification frequencies $f^{(n)}$ modulated onto the payload signal here can be unambiguously measurably lower in frequency than the payload signal, namely such that they do not influence the behavior of other components in the transmission path such as, for example, fiber amplifiers.

The n identification frequencies $f^{(n)}$ can thereby differ for each WDM channel in the system.

Variable attenuators can be used for generating n different identification frequencies $f^{(n)}$.

Lasers and/or transmission diodes that generate n different identification frequencies by low-frequency, direct modulation can also be employed. Further, Mach-Zehnder modulators as well as differently configured modulators can also be employed for impressing the n identification frequencies.

A tap coupler is present for coupling a part of the optical power out of the transmission path. The current crosstalk in the system can be acquired at this location.

At least one through n photodiodes can be present for the detection of n signals following the demultiplexer.

When the n signals are detected with a photodiode, a switch can also be provided that redirects n signals onto a photodiode following the demultiplexer.

Advantageously, n phase-synchronous detectors (lock-in amplifiers) can be present for the independent determination of the synchronous part of the payload signal and of the synchronous part of the crosstalking signal.

It is self-evident that the aforementioned features and the features of the invention yet to be explained below can be employed not only in the respectively indicated combination but also in other combinations or standing alone without leaving the scope of the invention.

Further features of the invention derive from the subclaims and from the following description of an exemplary embodiment with reference to the drawing.

The invention is described below on the basis of the single drawing.

FIG. 1 shows a schematic illustration of an inventive wavelength-division multiplex system with the components required for the determination of the individual crosstalk of a specific, of a plurality or of all channels onto a payload channel.

A low-frequency identification frequency $f^{(n)}$ with the modulation index $m^{(n)}$ is additionally modulated on a high-frequency payload signal. The identification frequency differs for each WDM channel 1 in the system. This, for example, can occur with variable attenuators 6 or with low-frequency, direct modulation of the lasers or of the signal diodes or with Mach-Zehnder as well as other types of modulators.

The various optical signals are superimposed on a fiber by a multiplexer 2. In order to detect the current crosstalk at a specific location in the system, a part of the optical power is coupled out of the transmission path with the assistance of a tap coupler. The individual WDM channels 1 are in turn spatially separated from one another by a following demultiplexer 4 and are subsequently detected by photodiodes 8. A respective photodiode can be employed for each WDM channel 1, or the various signals following the demultiplexer 4 can be redirected onto only one photodiode 8 with the assistance of a switch 11.

The photocurrent supplied by the photodiode is composed of the synchronous part of the actual payload signal $I_{Ph\_synch,channel}$, of the synchronous part of every crosstalking signal $I_{Ph\_synch,frequency}^{(n)}$ as well as of a non-synchronous part $I_{Ph\_nonsynch}$ of all optical signals present on the channel that can be identified independently of one another by a phase-synchronous detector 9. The crosstalk of one specific, of a plurality or of all channels on the payload channel can be calculated therefrom.

FIG. 1 describes a preferred embodiment. Inventively, both the application of the identification frequency 5 as well as the evaluation 10 can ensue differently therefrom. For example, the application of the identification frequency 5 can ensue by direct modulation of the lasers.

What is claimed is:

1. A method for measuring individual crosstalk of at least one of a plurality of channels on a payload channel in wavelength-division multiplex (WDM) systems, the method comprising the steps of:

modulating, at an input-side, an identification frequency $f^{(n)}$ onto at least one first WDM channel in addition to a payload signal;

supplying an input-side multiplexer with n WDM channels which have respectively different n channel frequencies;

combining the n WDM channels via the input-side multiplexer, with the at least one first WDM channel having also had the identification frequency $f^{(n)}$ modulated thereon;

dividing, via an output-side demultiplexer which is connected to the input side multiplexer via a transmission link, an incoming signal into the n WDM channels with the n channel frequencies; and detecting, by a phase synchronous detector which corresponds to the first identification frequency $f^{(n)}$, in at least one second WDM channel, a crosstalking signal from the at least one first WDM channel.

2. A method for measuring individual crosstalk as claimed in claim 1, the method further comprising the step of modulating n different identification frequencies $f^{(n)}$ onto the n WDM channels of the payload signal with a modulation factor $m^{(n)}$ in a one to one manner.

3. A method for measuring individual crosstalk as claimed in claim 2, wherein the n identification frequencies $f^{(n)}$ are measurably lower in frequency than the payload signal so as not to influence behavior of other components in the transmission link.

4. A method for measuring individual crosstalk as claimed in claim 2, wherein the n different identification frequencies $f^{(n)}$ are generated by variable attenuators.

5. A method for measuring individual crosstalk as claimed in claim 2, wherein the n different identification frequencies $f^{(n)}$ are generated by low-frequency, direct modulation of lasers.

6. A method for measuring individual crosstalk as claimed in claim 2, wherein the n different identification frequencies $f^{(n)}$ are generated by low-frequency, direct modulation of transmission diodes.

7. A method for measuring individual crosstalk as claimed in claim 2, wherein the n different identification frequencies are generated by Mach-Zehnder modulators.

8. A method for measuring individual crosstalk as claimed in claim 1, the method further comprising the steps of:

defining a synchronous part of the payload signal $I_{ph\_synch,channel}$ and a synchronous part of the crosstalking signal $I_{ph\_synch,frequency}^{(n)}$ of all optical signals present on the payload channel independently of one another by the phase synchronous detector; and calculating a current crosstalk from a ratio of the synchronous part of the crosstalking signal and the synchronous part of the payload signal, with the signals being represented as currents.

9. A method for measuring individual crosstalk as claimed in claim 8, the method further comprising the step of measuring the current crosstalk by coupling a part of an optical power out of the transmission link.

10. A method for measuring individual crosstalk as claimed in claim 9, wherein a tap coupler assists in the coupling of the part of the optical power out of the transmission link.

11. A method for measuring individual crosstalk as claimed in claim 8, wherein the crosstalk of an arbitrary channel onto the payload channel is determined via the equation:

$$CT_{Frequency(n) \leftrightarrow Channel} = 10 \cdot \log\left(\frac{I_{Ph\_synch,frequency}^{(n)}}{I_{Ph\_synch,channel}} \cdot \frac{m}{m^{(n)}}\right).$$

12. A method for measuring individual crosstalk as claimed in claim 8, wherein the crosstalk of all influencing channels onto the payload channel is determined via the equation:

$$CT_{Frequency(n)\leftrightarrow Channel} = 10 \cdot \log\left(\left(\sum_{n=1}^{M-1} \frac{I_{Ph\_synch,frequency^{(n)}}}{m^{(n)}} \cdot m\right) \middle/ I_{Ph\_synch,channel}\right).$$

13. A method for measuring individual crosstalk as claimed in claim 8, wherein the current crosstalk is measured at an end of the transmission link.

14. A method for measuring individual crosstalk as claimed in claim 1, wherein the identification frequency is derived from a high-precision system clock of the WDM system.

15. A method for measuring individual crosstalk as claimed in claim 1, wherein the identification frequency is derived from a data rate.

16. A method for measuring individual crosstalk as claimed in claim 1, wherein the detection of n signals following the demultiplexer occurs with the assistance of at least one of n photodiodes.

17. A method for measuring individual crosstalk as claimed in claim 1, wherein the n signals following the demultiplexer are redirected onto only one photodiode with the assistance of a switch.

18. A wavelength-division multiplex (WDM) system, comprising:

n WDM channels;

parts for modulating, on an input side, an identification frequency $f^{(n)}$ onto at least one first WDM channel in addition to a payload signal;

an input-side multiplexer for combining the n WDM channels supplied to it, with each of the n WDM channels having respectively different n channel frequencies, and with the at least one first WDM channel having also had the identification frequency $f^{(n)}$ modulated thereon;

a transmission link connected to the input-side multiplexer;

an output-side demultiplexer connected to the transmission link that respectively divides an incoming optical signal on a fiber onto the n WDM channels; and a phase synchronous detector which corresponds to the first identification frequency $f^{(n)}$ at an output side in at least one second WDM channel, for detecting a crosstalking signal from the at least one first WDM channel.

19. A wavelength-division multiplex system as claimed in claim 18, further comprising, for each of the n WDM channels at the input side, parts for modulating n different identification frequencies $f^{(n)}$ onto the n WDM channels with a modulation factor $m^{(n)}$ in a one to one manner.

20. A wavelength-division multiplex system as claimed in claim 19, wherein the n identification frequencies $f^{(n)}$ are measurably lower in frequency than the payload signal so as not to influence behavior of other components in the transmission link.

21. A wavelength-division multiplex system as claimed in claim 19, further comprising variable attenuators for generating the n different identification frequencies $f^{(n)}$.

22. A wavelength-division multiplex system as claimed in claim 19, further comprising lasers for generating the n different identification frequencies $f^{(n)}$ by low-frequency direct modulation.

23. A wavelength-division multiplex system as claimed in claim 19, further comprising transmission diodes for generating the n different identification frequencies $f^{(n)}$.

24. A wavelength-division multiplex system as claimed in claim 19, further comprising Mach-Zehnder modulators for generating the n different identification frequencies $f^{(n)}$.

25. A wavelength-division multiplex system as claimed in claim 18, further comprising, for each of the n WDM channels at the output side, a plurality of phase synchronous detectors corresponding to the n different identification frequencies $f^{(n)}$ for detecting respective crosstalking signals, wherein a synchronous part of the payload signal $I_{ph\_synch,channel}^{(n)}$ and a synchronous part of the crosstalking signal $I_{ph\_synch,frequency}^{(n)}$ of all optical signals present on the payload channel are defined independently of one another by a respective phase synchronous detector and a current crosstalk is calculated from a ratio of the synchronous part of the crosstalking signal and the synchronous part of the payload signal, with the signals being represented as currents.

26. A wavelength-division multiplex system as claimed in claim 25, wherein the crosstalk is determined by coupling a part of an optical power out of the transmission link.

27. A wavelength-division multiplex system as claimed in claim 26, further comprising a tap coupler for coupling the part of the optical power out from the transmission link.

28. A wavelength-division multiplex system as claimed in claim 25, wherein the crosstalk is determined at an end of the transmission link.

29. A wavelength-division multiplex system as claimed in claim 25, wherein there are n phase synchronous detectors, and the n phase synchronous detectors are lock-in amplifiers.

30. A wavelength-division multiplex system as claimed in claim 18, wherein the identification frequency $f^{(n)}$ differs for each WDM channel in the WDM system.

31. A wavelength-division multiplex system as claimed in claim 18, further comprising at least one of n photodiodes for detecting the n signals following the demultiplexer.

32. A wavelength-division multiplex system as claimed in claim 31, further comprising a switch for redirecting the n signals following the demultiplexer onto only one photodiode.

* * * * *